United States Patent [19]

Garrison

[11] 4,173,760
[45] Nov. 6, 1979

[54] PASSIVE ACQUISITION SYSTEM

[75] Inventor: John B. Garrison, Silver Spring, Md.

[73] Assignee: The United States of America as represented by the Secretary of the Navy, Washington, D.C.

[21] Appl. No.: 522,789

[22] Filed: Jan. 24, 1966

[51] Int. Cl.² .............................................. G01S 5/04
[52] U.S. Cl. .................................. 343/112 R; 343/15
[58] Field of Search .................................. 343/112, 15

[56] References Cited

U.S. PATENT DOCUMENTS

| 2,891,246 | 6/1959 | Reed, Jr. | 343/112 |
| 2,971,190 | 2/1961 | Busignies | 343/112 |
| 3,171,126 | 2/1965 | Wiley | 343/112 |

Primary Examiner—Maynard R. Wilbur
Assistant Examiner—Richard E. Berger

[57] ABSTRACT

The present invention provides a method and apparatus for effecting, in a passive manner, the acquisitioning of a broadband barrage jammer type radar target, by detecting the differential delay between the barrage signal as received at a predetermined location over direct and indirect paths and producing a signal distinctly identifying the location of the jammer target relative to the receiving station. More specifically, the present invention includes means for generating reference pulses of varying frequency which are utilized in determining the phase relationship which exists between each of these reference pulses and the corresponding frequency component of the jammer signal as received over the direct path to the target. The jammer signal, as received over the indirect or delayed path, has each of its frequency components corresponding to the frequencies of the generated reference pulses adjusted so that the only phase difference then present between the indirectly received jammer signal components is due to the differential distance existing between the direct and indirect jammer signal paths to the receiving location. These adjusted components of the indirect jammer signal are then combined in such a manner as to produce an output signal which distinctly identifies the location of the jammer target.

10 Claims, 6 Drawing Figures

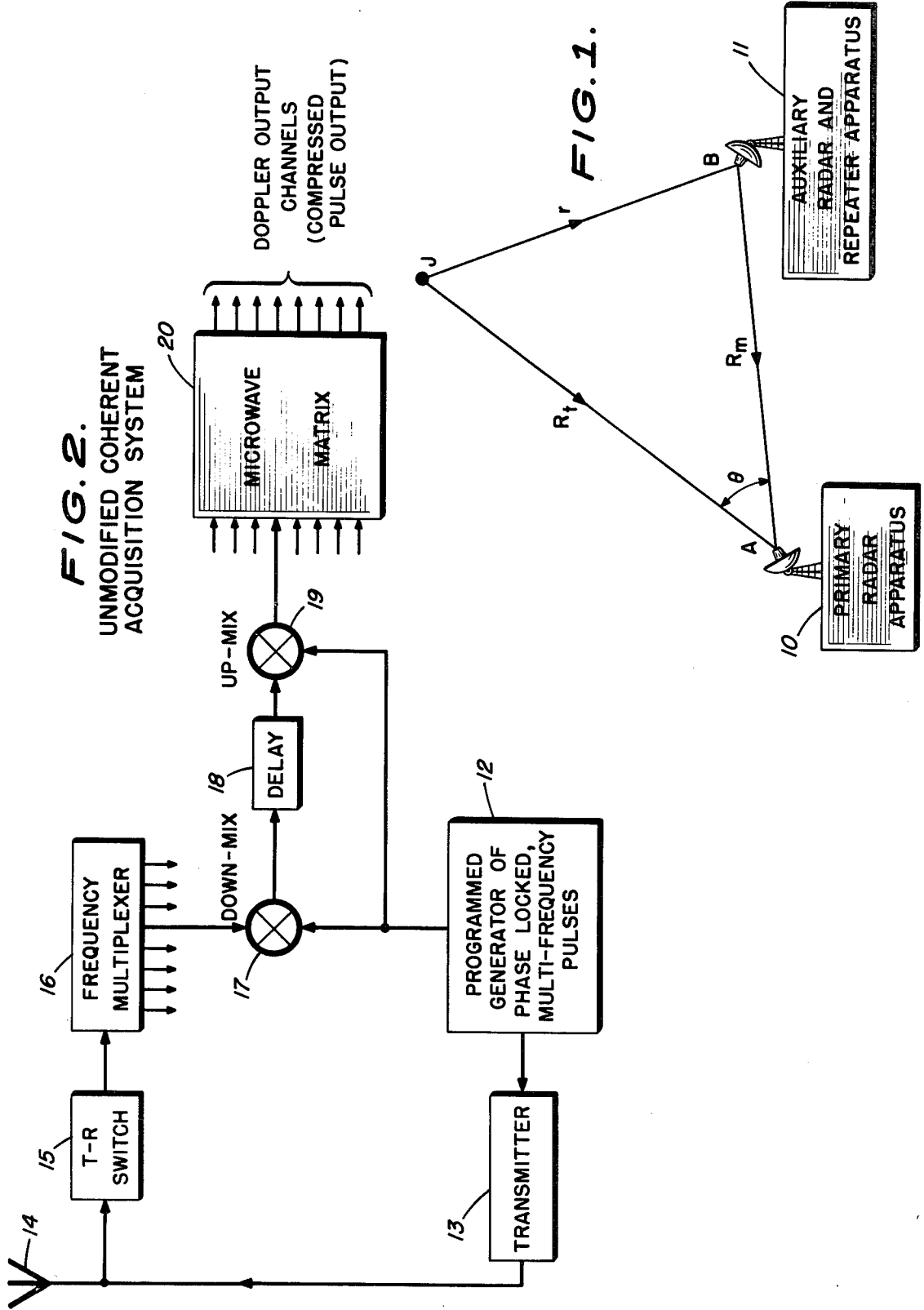

PASSIVE ACQUISITION SYSTEM

The present invention represents an improvement on the active acquisition system disclosed in my copending patent application, Ser. No. 266,113, now U.S. Pat. No. 3,309,700, filed Mar. 18, 1963 and being commonly assigned to the U.S. Government.

The present invention generally relates to radar systems and more particularly pertains to a method and apparatus operating on the radar principle for effecting passive acquisition, in range and/or Doppler, of a broadband barrage jammer.

When a broadband barrage jammer is encountered whose noise power at all frequencies is substantial, it is impossible to detect and track in range or Doppler, with presently available equipment. However, unless this barrage jammer can be accurately located and tracked, the normal effectiveness of the radar system being jammed will obviously be seriously and permanently impaired.

Accordingly, the present invention proposes to provide a method and apparatus capable of locating or acquisitioning such a barrage jammer so that the search radar can properly track it and direct its elimination. More specifically, the present invention operates in a completely passive manner; i.e., nothing is transmitted by the apparatus to accomplish the acquisition of the jammer. Instead, the present invention measures the differential delay between the barrage signal as received over two distinct paths of different lengths, in terms of the time delay of a compressed pulse which is formed as a result of the cross-correlation of the frequencies and phases of the two received signals. By use of the present invention, the barrage jammer can be accurately located, both in range and in Doppler, to thus permit the radar apparatus to readily track the jammer accurately.

In view of the foregoing, it is a general object of the present invention to provide a method and apparatus for effecting passive acquisition of a broadband barrage jammer.

A further object of the present invention is to provide a method and apparatus, utilizing frequency diversity and pulse compression techniques, for effecting passive acquisition of a broadband barrage jammer through the cross-correlation of jammer signals received over paths of different lengths.

A still further object of the present invention is to provide a method and apparatus for effecting acquisition of a broadband barrage jammer, by periodically sampling the various frequency components of the barrage signal, as received over a first path, and subsequently comparing these frequency components, on a phase basis, with the barrage signal received over a second path of different length, to thereby produce an output signal distinctly identifying the location of the jammer in range and/or Doppler.

Other objects and many of the attendant features of this invention will be readily appreciated as the same becomes better understood by reference to the following detailed description, when considered in connection with the accompanying drawings, wherein:

FIG. 1 is a simplified block diagram of the present invention, also illustrating the triangulation problem solved by the present invention in order to ascertain the location of a broadband barrage jammer, denoted by the reference character J;

FIG. 2 is a block diagram of the acquisition system disclosed in my copending patent application, Ser. No. 266,113, filed Mar. 18, 1963, and a portion of which is employed in my present invention;

Figure 3:
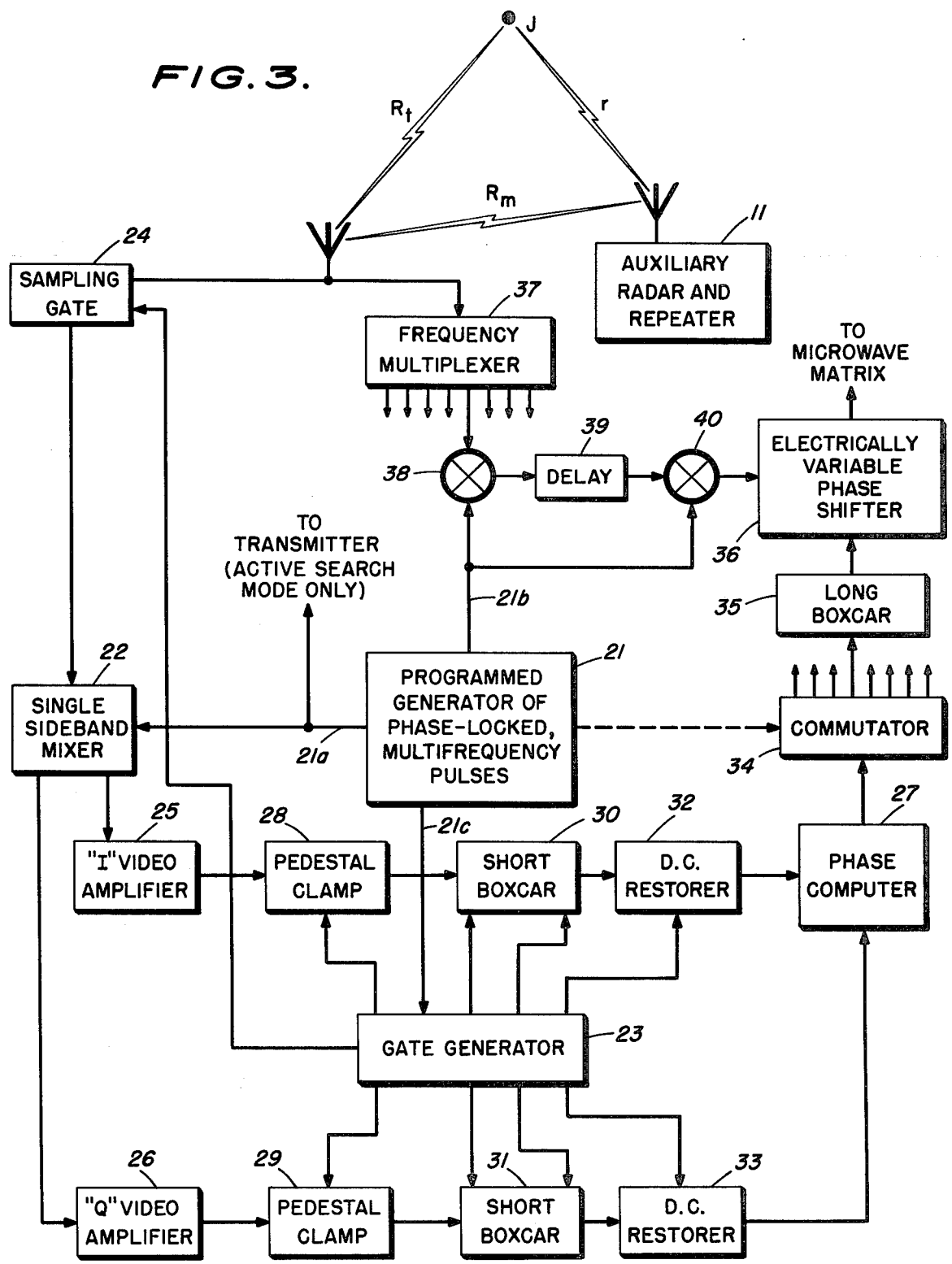
FIG. 3 is a detailed block diagram of the preferred embodiment of the present invention.

As stated previously, the method and apparatus provided in accordance with the present invention accomplishes passive acquisition of a broadband barrage jammer, represented at J in FIG. 1, by the cross-correlation of jammer signals received at location A in FIG. 1, by the primary radar apparatus 10, over a pair of paths of different lengths.

Specifically, it will be noted in FIG. 1 that a triangle is formed by the jammer J, the primary radar apparatus 10 and certain auxiliary radar and repeater apparatus 11 located at position B, at a known distance from the primary radar apparatus 10. The auxiliary apparatus 11 may be of any well-known construction capable of receiving the jammer noise signal and relaying it on to the primary apparatus 10; i.e., the auxiliary apparatus 11 causes the jammer signal to be conveyed to the primary apparatus 10 over an indirect path. In FIG. 1, the direct path from the jammer J to the primary radar apparatus 10 is designated by reference character $R_t$; the path from the jammer J to the auxiliary radar and repeater apparatus 11 is designated $r$; the path from the auxiliary radar and repeater apparatus 11 to the primary radar apparatus 10 is designated $R_m$; and, the angle between the paths $R_t$ and $R_m$ is designated $\theta$.

From FIG. 1 it is readily seen that $$r = (R_t + \Delta) - R_m \quad \text{(eq. 1)}$$

where $\Delta$ is the difference in the lengths of the direct path $R_t$ and the indirect path $R_m + r$. Then, from the law of cosines, $$R_t = \frac{\Delta (R_m - \frac{\Delta}{2})}{\Delta - R_m(1 - \cos\theta)} \quad \text{(equation 2)}$$

Obviously, the jammer location, in angle, can be measured by the radar antenna setting at location A, and therefore, $\theta$ is a known quantity. Accordingly, an accurate determination of the quantity $\Delta$ will provide all of the factors necessary to a solution for $R_t$, the jammer range.

Since the present invention is an improvement over the target acquisition system described in my previously mentioned, copending patent application, Ser. No. 266,113, an understanding of the principles upon which that system is based is a prerequisite to a satisfactory understanding of the present invention.

Referring now to FIG. 2 and the block diagram of my previously proposed system, the output of a phase-locked, multifrequency pulse generator 12 is applied to a transmitter 13, for radiation by radar antenna 14, whereby a burst of pulses having different frequencies, from pulse to pulse, is transmitted. These pulses, when reflected from a target and received back at the antenna 14, are supplied through a suitable T-R switch 15 to a frequency multiplexer 16. This multiplexer 16 functions in a conventional manner to selectively apply pulse signals into a plurality of receiver channels, each designed to accept only one of the transmitted frequencies. In FIG. 2, there are eight outputs illustrated for the multiplexer 16 (assuming eight distinct transmitted pulse frequencies), but, only a single receiver channel is illustrated in detail, in order to simplify the present discussion.

More specifically, the typical receiver channel includes a down-mixer 17 where the channel input signal from the frequency multiplexer 16 is combined with the output of the multifrequency pulse generator 12, at that same frequency, plus any convenient offset frequency to produce a pulse of intermediate frequency according to well-known heterodyning techniques. The resulting output pulse signal from down-mixer 17 is then applied to a suitable delay line 18 where such signal is delayed by an amount selected to compensate for the differences in transmission time from pulse to pulse, so that the pulse outputs of all receiver channels occur concurrently. Accordingly, any phase difference existing between the pulse outputs of the various receiver channels will be that due to the relative movement of the target during the transmission, and, by measuring this phase difference, it is possible to accurately determine the relative velocity, etc. of the target.

In order to determine this existing phase relationship, the delayed pulse output from delay line 18 is then heterodyned back up to the transmitted frequency, in an up-mixer 19, and fed into a microwave matrix 20 which has a plurality of outputs corresponding to a number of different target velocities. As is fully discussed in my copending application, Ser. No. 266,113, the matrix 20 provides small, preset time delays to its various pulse inputs to compensate for the relative phase shift between pulses due to target motion, in the expected range of target velocities. As a result, the various receiver channel output pulses applied to the matrix 20 are thus summed therein to produce a compressed pulse at the output of the matrix 20, corresponding accurately to the velocity of the target being detected.

In accordance with the present invention, the system illustrated in FIG. 2, after proper modification, can be made to yield a compressed pulse at a time dependent upon the value of the differential distance $\Delta$, after an arbitrary zero time, with a jammer J emitting broadband continuous noise. This compressed pulse will appear at the output of the apparatus of the present invention corresponding to the quasi-doppler frequency $f_d$ which is $d\Delta/dt$, distinctly identifying the location of the jammer, depending upon the type of microwave matrix employed in the present invention, as will be described in more detail hereinafter.

Referring now to FIG. 3 of the accompanying drawings which illustrates the preferred embodiment of the present invention, the primary radar apparatus includes a programmed generator of phase-locked, multifrequency pulses 21 which operates, as described in my copending application, Ser. No. 266,113, to here again produce a series or burst of output pulses wherein the frequency varies from pulse to pulse according to a predetermined programmed sequence. The pulse outputs from the generator 21 are fed to a single sideband mixer 22 and gate generator 23, over lines 21a and 21c respectively. As will be described in more detail hereinafter, this gate generator 23 is triggered, each time a pulse is received from the generator 21, to momentarily open a sampling gate 24 periodically and thereby apply samples of the jammer noise signal to the single sideband mixer 22.

The mixer 22 is of conventional design, but, because of narrow banding by video amplifiers 25 and 26, connected to its output, each output pulse from the programmed generator 21 is caused to be mixed therein with the corresponding frequency component of the received jammer signal. Thus, if the output pulse from pulse generators 21 is at frequency $f_1$, then the $f_1$ component of the jammer signal is mixed therewith. Consequently, at the output of mixer 22, appears a pair of voltage signals representing respectively the in-phase and quadrature components of the sampled jammer signal component relative to the corresponding frequency pulse generated by the pulse generator 21. This pair of voltage signals is then applied to video amplifiers 25 and 26 respectively, for subsequent application to phase computer circuitry 27. Such application occurs via: pedestal clamp circuits 28 and 29; short boxcar circuits 30 and 31; and, D.C. restorers 32 and 33, and, is under the control of gate generator 23, as will be described in detail hereinafter.

The phase computer 27 may be of any suitable design, such as is disclosed in the copending application of John H. Kuck, Ser. No. 508,398, filed Nov. 17, 1965 and having a common assignee with the present invention. The output of this phase computer 27 is a voltage signal whose amplitude is an analog of the phase difference existing between each output pulse being generated by the pulse generator 21 and the corresponding frequency component of the jammer signal being transmitted by the barrage jammer J of FIGS. 1 and 3. This analog voltage signal at the output of phase computer 27 is then selectively applied, via commutator 34 and long boxcar circuit 35, to adjust an electrically variable phase shifter 36, for purposes to be described in more detail hereinafter.

It should be pointed out at this time that the long boxcar circuit 35 and phase shifter 36 illustrated in FIG. 3 are included in a selective receiver channel designed to process one specific frequency component of the jammer signal under investigation. In other words, the preferred embodiment of the present invention contemplates a separate receiver channel for each distinct pulse frequency produced by the pulse generator 21; i.e., for each different frequency component to be scrutinized in the received jammer signal. By way of example, if the pulse generator 21 produces pulses of eight distinct frequencies, to thereby investigate eight different frequency components of the jammer signal, eight receiver channels would be employed, each functioning in accordance with the teachings of my copending application, Ser. No. 266,113, mentioned above. For simplicity and ease of description, only a single receiver channel is shown in detail in FIG. 3 of the accompanying drawings.

As mentioned previously, the noise signal being transmitted by the jammer J is also received by the auxiliary radar and repeater apparatus 11 and is thereby relayed to the primary radar apparatus. The indirect path taken by this relayed jammer signal is represented, in FIGS. 1 and 3, by the quantity $r + R_m$. Thus, the reception, by the primary radar apparatus of FIGS. 1 and 3, of any particular frequency component of the jammer signal is delayed from the direct reception of that frequency component, over path $R_t$, by a time amount dependent upon the differential distance Δ. As also mentioned previously, if this quantity Δ can be accurately measured, the jammer location is then readily attainable, in accordance with the foregoing equations.

It should be understood at this time that, in practice, the auxiliary radar and repeater apparatus 11 need not necessarily be stationary relative to the primary radar apparatus 10. Rather, it is contemplated that such auxiliary apparatus 11 could, if desired, be a missile repeater, so long as its location relative to the primary apparatus 10 is accurately known.

In any event, the delayed jammer signal relayed from the auxiliary radar and repeater apparatus 11 is received by the primary radar apparatus, over path $R_m$ of FIG. 3, where the various frequency components of this delayed jammer signal which are to be scrutinized, in determining the quantity Δ, are applied selectively to the appropriate ones of a plurality of receiver channels by frequency multiplexer 37. Thus, this frequency multiplexer 37 is illustrated, in FIG. 3, as feeding eight different output channels (assuming that pulses of eight destinct frequencies are produced by generator 21), each of which is assigned to a different frequency equal to that of one of the output pulses being generated by the pulse generator 21. For the sake of simplicity, only one of these receiver channels has been shown in detail.

More specifically, each component of the delayed jammer signal is applied, by multiplexer 37, to a down-mixer circuit 38 in the appropriate receiver channel where the particular jammer signal component is heterodyned with the pulse of corresponding frequency being generated by the pulse generator 21, according to the teachings of my copending application, Ser. No. 266,113, noted above. Hereinafter, the multifrequency pulses produced by the generator 21 will be referred to as the local oscillator (L.O.) reference pulses.

Subsequently, the output of the down-mixer 38 is applied to a delay circuit 39 which is preset, in each of the various receiver channels, to compensate for the time interval between some preselected zero time point and the time at which the corresponding L.O. reference pulse is produced by the pulse generator 21. Thus, if these reference pulses were generated by pulse generator 21 in the sequence $f_1$, $f_2$, $f_3$, etc., the delay circuit 39 in the appropriate receiver channels for these different frequencies would be preset such that the delay imparted thereby in the $f_2$ channel would be greater than that in the $f_1$; whereas, the delay in the $f_3$ channel would be still greater. Such compensation thus serves a function identical to that of the compensation for variations in transmission time discussed previously in connection with FIG. 2.

The output signal from the delay circuit 39 is then applied to a suitable up-mixer circuit 40, along with the appropriate L.O. reference pulse from the pulse generator 21, to reproduce the original microwave frequency which is applied as input to the electrically variable phase shifter 36. As previously discussed, a control signal input to the phase shifter 36 is the voltage signal produced by the phase computer 27 and which is an analog of the phase difference between the reference pulse being generated by pulse generator 21 and the corresponding frequency component of the jammer noise signal received by the primary radar apparatus over the direct path $R_t$.

Before proceeding, it should be remembered that, as each successive L.O. reference pulse is generated by the pulse generator 21, it is mixed with the corresponding frequency component of the jammer signal received over direct path $R_t$, at the single sideband mixer 22, and the resulting in-phase and quadrature component voltage signals indicative of the phase angle between the jammer component and its corresponding L.O. reference pulse are applied to the phase computer 27, for production of the voltage analog of this relative phase difference. In this regard, the short boxcar circuits 30 and 31 are controlled by the gate generator 23, as will be described hereinafter, to store or hold these in-phase and quadrature components for a time interval slightly less than the interpulse period of the pulse generator 21. This greatly simplifies the circuitry requirements of phase computer 27 by increasing the allowable operating time thereof. Each of the boxcars 30 and 31 can be of conventional design and might include, for example, a storage capacitor circuit which effectively stores its input voltage level until discharged.

As the phase computer 7 produces its voltage analog for each successive frequency component of the received jammer signal, such voltage analogs are then selectively applied, by the commutator 34, to adjust the electrically variable phase shifter 36 in the appropriate receiver channels assigned to those frequencies. This commutator 34 is controlled, as will be described hereinafter, in accordance with the specific reference pulse being generated by the pulse generator 21. Such control is represented in FIG. 3 by the dotted line extending thereto from the programmed pulse generator 21. Consequently, each of the channels is compensated both for the difference in generation time of the different L.O. reference pulses from the pulse generator 21, by appropriately presetting the delay circuit 39 in that channel, and, for the inherent phase difference existing between each generated reference pulses and the corresponding jammer signal component, by properly adjusting the phase shifter 36 for that channel. In order to insure continuous control of each phase shifter 36, a long boxcar circuit 35 is provided for each receiver channel to store or hold one analog voltage signal applied to that channel until a new analog voltage signal is produced.

In light of the foregoing description, it is seen that each of the receiver channels produces an output concurrently with the remaining channels and, that the only phase difference appearing between these channel output signals is due to the differential distance Δ existing between the indirect or delayed jammer signal path represented by $r + R_m$ and the direct jammer signal path represented by $R_t$. As taught in copending application, Ser. No. 266,113, the outputs from this plurality of receiver channels is then combined in a microwave matrix (not shown) to produce a compressed pulse distinctly indentifying the location of the jammer J.

Figure 4:
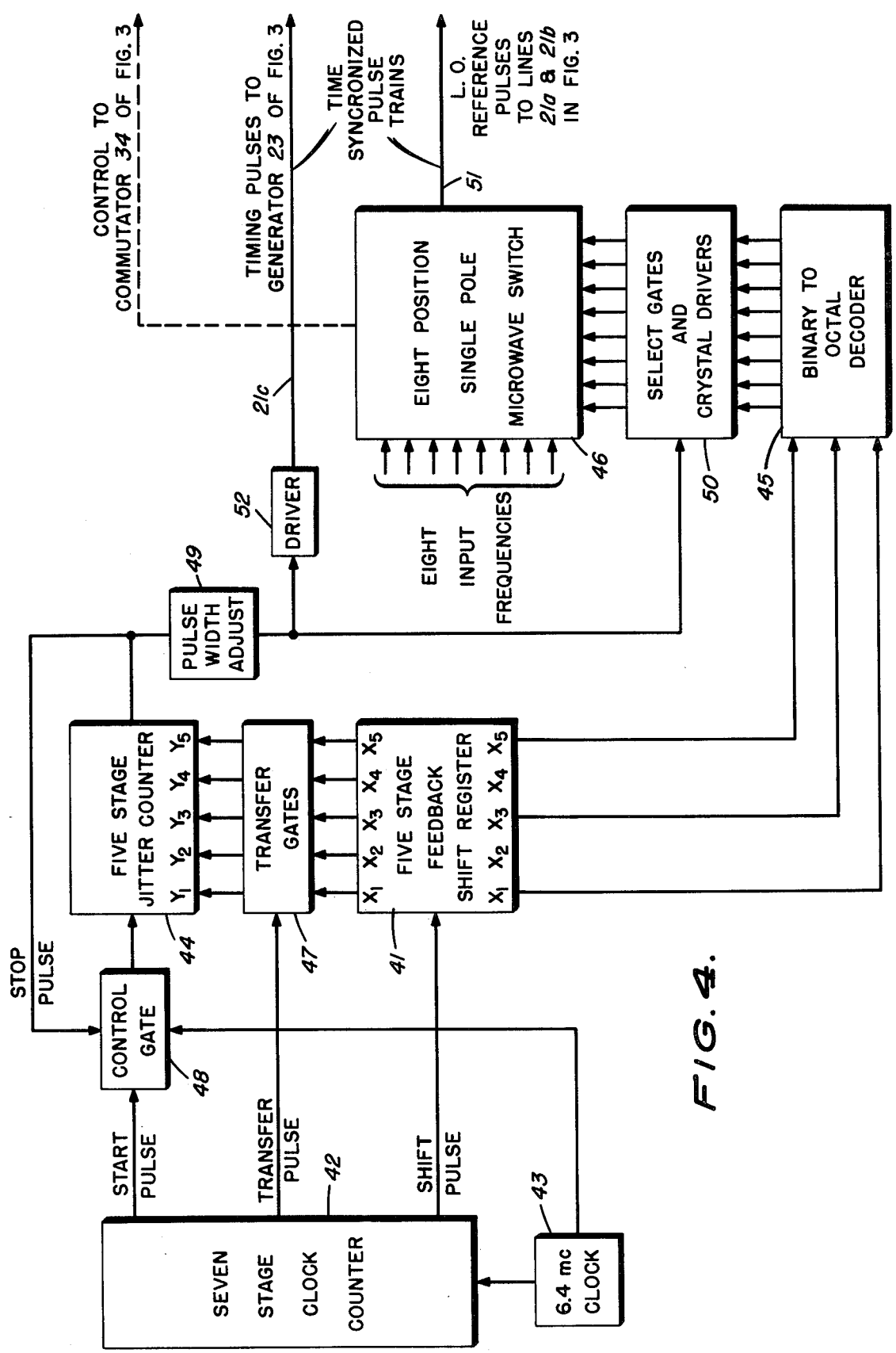
FIG. 4 is a block diagram illustrating one form of programmed pulse generating apparatus employed in the preferred embodiment of FIG. 3.

One form of programmed generator of phase-locked, multifrequency pulses suitable for employment in the preferred embodiment of the present invention is illustrated in FIG. 4 of the accompanying drawings and operates as described in my copending application, Ser. No. 266,113. Specifically, the programmed pulse generator includes: a feedback shift register 41 which generates a preferred code; a clock counter 42 which controls the timing of the circuitry of FIG. 4 in response to a crystal clock 43; a jitter counter 44 which converts the code from the shift register 41 into a jitter which is imparted to the pulse output; and, a logic circuit consisting of binary to octal converter 45 and microwave switch 46 which specifies one of eight frequencies to be generated as the pulse output of the circuitry of FIG. 4, according to the code in shift register 41.

Clock pulses derived from crystal clock 43 are applied to and counted by the seven stage clock counter 42 from which is derived a shift pulse, a clear pulse, a transfer pulse and a start pulse. In initiating operation of the illustrated apparatus, the shift pulse from clock counter 42 is applied to register 41 thereby advancing its state and the jitter counter 44 is cleared. The transfer pulse then opens a set of transfer gates 47, allowing each of the feedback shift register flip-flop circuits to set corresponding flip-flops in the five stages jitter counter 44. The start pulse then opens a control gate 48 which allows clock pulses from the crystal clock 43 to fill the jitter counter 44, until an overflow pulse occurs. This overflow pulse is then applied, on the one hand, as a stop pulse to control gate 48, thereby disconnecting the crystal clock 43 from jitter counter 44, and on the other hand, via a pulse width adjust circuit 49, to circuit 50 operating as an "and" gate which applies the coded output of binary to octal converter 45 to the eight position microwave switch 46, where a single output pulse frequency is selected according to the applied code. This operation of microwave switch 46 in coded fashion thus causes its eight input frequencies to be selectively supplied in sequence to the output line 51, in FIG. 4, and from there to the lines 21a and 21b in FIG. 3, as the local oscillator reference pulses to be processed with the jammer signal received over both the direct path $R_t$ and the indirect or delayed path $r+R_m$. In addition, for the sake of simplifying the drawings, the dotted line extending from the microwave switch 46 is intended here to generally represent that the coding condition of the apparatus of FIG. 4 controls the position of the commutator 34 of FIG. 3, such that the proper receiver channel is selected in accordance with the frequency of the pulse then being produced by the circuitry of FIG. 4.

As also seen in FIG. 4, the input to converter 45 is derived from the first, third, and fifth flip-flops in shift register 41. Therefore, each of the eight available frequencies will be repeated four times during an assumed 32 pulse dwell time, for example, but each of these pulses will have a different but known delay time associated therewith. As mentioned previously, the delay circuits 39 (see FIG. 3) contained in the various receiver channels are preset to compensate for this varying delay in the generation of the output pulse from the circuitry of FIG. 4.

At the output of the pulse width adjust circuit 49, a pulse appears each time an output is to be generated from the microwave switch 46 and is applied, through a driver circuit 52 and along line 21c, as the input trigger pulse to the gate generator 23 of FIG. 3. As mentioned previously, the gate generator 23 functions to produce various gate pulses employed in controlling: the pedestal clamp circuits 28 and 29; the short boxcar circuits 30 and 31; the D.C. restorer circuits 32 and 33; and, the sampling gate 24. The details of the gate generator 23 are not illustrated inasmuch as this circuit can be of any conventional design, well-known to those skilled in the art, for producing the necessary gate pulses.

Figure 6:
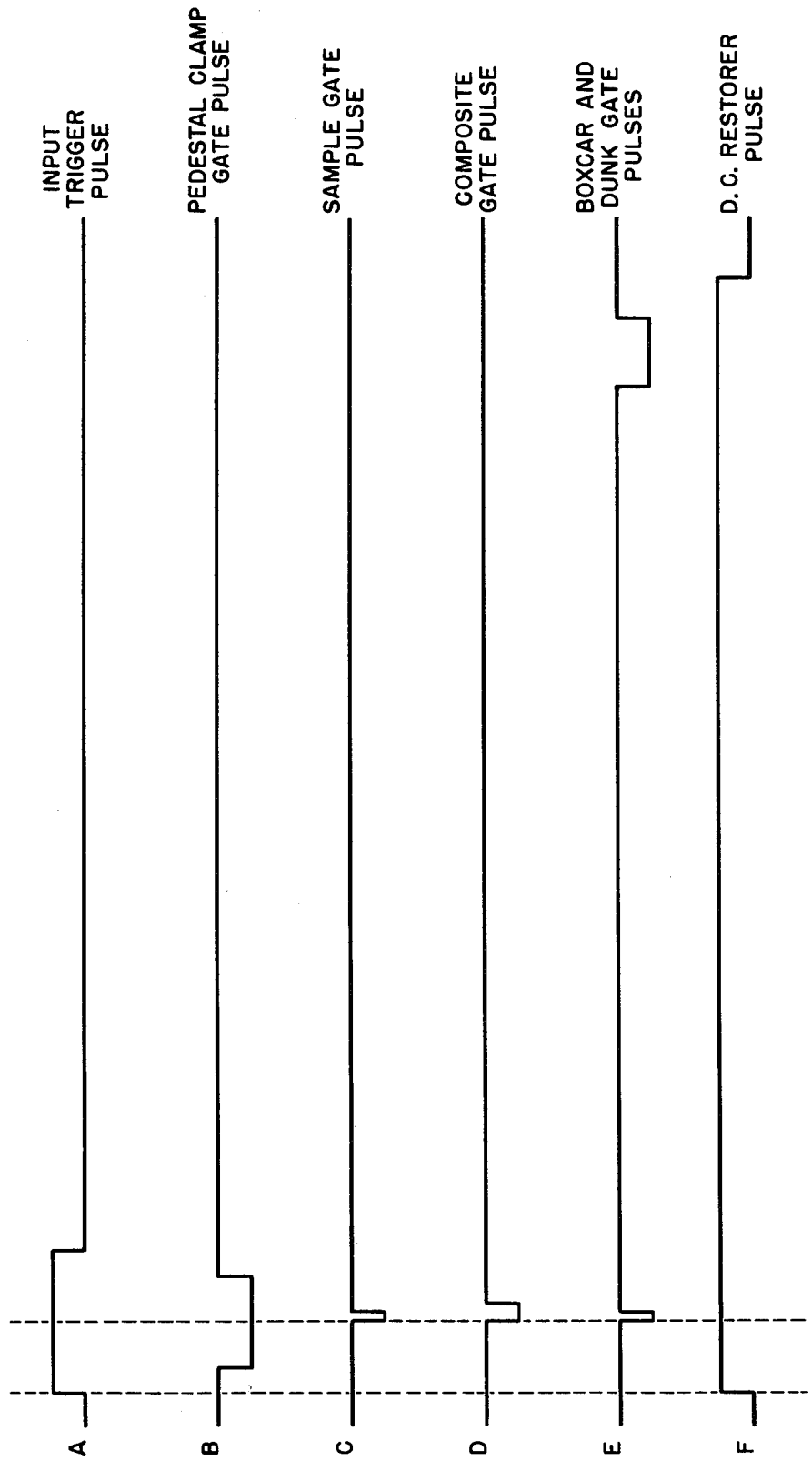
FIG. 6 is an illustration of certain waveforms developed during operation of the preferred embodiment of the present invention.

Specifically, the gate generator 23 is controlled by an input trigger pulse, represented by the waveform A in FIG. 6, from the programmed generator of phase-locked multifrequency pulses 21. As previously mentioned, this input trigger pulse to the generator 23 is applied, via line 21c, each time the pulse generator 21 produces a new pulse. In response, the gate generator 23 is itself effective to produce: pedestal clamp gate pulse (waveform B) which is applied simultaneously to and controls operation of the pedestal clamp circuits 28 and 29; sample gate pulse (waveform C) which is applied to periodically open the sampling gate 24; composite, boxcar and dunk gate pulses (waveforms D and E) which are applied to the short boxcar circuits 30 and 31; and, D.C. restorer pulse (waveform F) applied to the D.C. restorer circuits 32 and 33.

The operation of the pedestal clamp, short boxcar and D.C. restorer circuits of FIG. 3 in response to the various gating pulses produced by gate generator 23 will now be discussed, making use of the typical and simplified block diagram of FIG. 5. More specifically, the pedestal clamp gate pulses from the gate generator 23 are applied, along line 70 in FIG. 5, to a pedestal clamp gate circuit 71 for effecting the desired operation of the over-all pedestal clamp circuit 28. The composite gate pulses from generator 23 are applied, over line 72, to a composite gate circuit 73 and the dunk and boxcar gate pulses are applied, over line 74, to a boxcar and dunk gate circuit 75 for effecting proper operation of the over-all short boxcar circuit 30. Finally, the D.C. restorer gate pulses from the gate generator 23 is applied, over line 76 to a D.C. restorer clamp gate circuit 77 for effecting proper control of the over-all D.C. restorer circuit 32.

Figure 5:
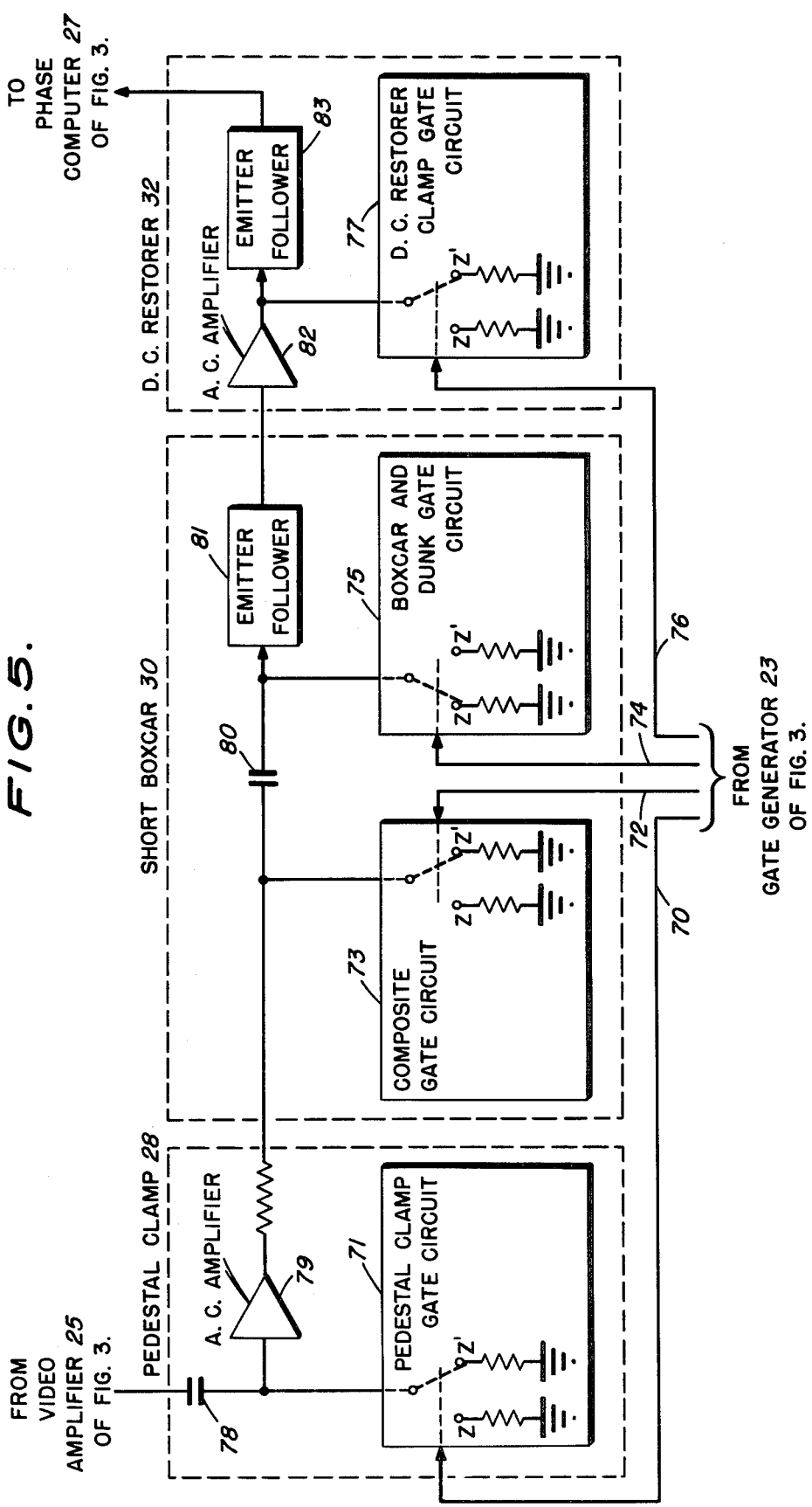
FIG. 5 is a simplified block diagram illustrating a portion of the apparatus of FIG. 3 in more detail.

Each of the gate circuits 71, 73, 75, and 77 shown in FIG. 5 are represented in simplified form as simple switches, operable between a very high impedance state represented by the reference character Z and a very low impedance state represented by the reference character Z'. In FIG. 5 it will be noted that the pedestal clamp gate circuit 71, the composite gate circuit 73 and the D.C. restorer clamp gate circuit 77 are each normally in their low impedance states Z'; whereas, the boxcar and dunk gate circuit 75 is normally in its high impedance state Z.

The over-all pedestal clamp circuit 28 furthermore includes capacitor 78 and A.C. amplifier 79. The value of capacitor 78 is selected so that, with the pedestal clamp gate circuit 71 normally in its low impedance state Z', the clamp circuit 28 is effective to differentiate any input signal received from the video amplifier 25 of FIG. 3. Obviously, this operation helps to remove any local oscillator pedestal which may happen to be present in the input because of unbalance in the single sideband mixer 22 of FIG. 3. On the other hand, when the pedestal clamp 28 is switched to its high impedance state, by the appropriate pedestal clamp gate pulse from gate generator 23, the input signal applied thereto is permitted to pass on to the A.C. amplifier and subsequently to the short boxcar circuit 30.

In the short boxcar circuit 30 is included storage capacitor 80 and emitter follower 81. This capacitor 80 functions to temporarily store the input signal applied for a time interval somewhat less than the interpulse spacing between the multifrequency pulses being generated by the pulse generator 21 of FIG. 3. More specifically, with the composite gate circuit 73 normally in its low impedance state Z', the left-hand side of capacitor 80 is kept discharged (except when the jammer noise signal is being sampled and compared to the reference pulse from pulse generator 21) in order to eliminate any transients due to the differentiated reference pulse pedestal. On the other hand, the boxcar and dunk gate circuit 75 being initially in a very high impedance state Z prevents charging of the capacitor 80 until an input signal pulse is received, and thereafter; i.e., once capacitor 80 is charged, causes such capacitor 80 to temporarily hold the charge until the dunk pulse is applied from gate generator 23.

The D.C. restorer 32 includes an A.C. amplifier 82 and an emitter follower 83 and functions to convert the A.C. output of the short boxcar circuit 30 into a D.C. voltage signal, by clamping the non-signal portion of its input to ground. Such clamping is accomplished by placing the D.C. restorer clamp gate circuit 77 in a very low impedance state Z', until an input signal pulse is applied thereto.

The detailed operation of the typical circuitry shown in FIG. 5, during a sampling of the jammer noise signal and the subsequent comparison of it with the appropriate L.O. reference pulse from pulse generator 21, will now be discussed by making use of the waveform diagram of FIG. 6. More specifically, the input trigger pulse (waveform A) applied in FIG. 3, from the pulse generator 21 to the gate generator 23, first causes the D.C. restorer pulse (waveform F) to be generated and applied, via line 76 in FIG. 5, to the D.C. restorer 32. This pulse places the D.C. restorer clamp gate circuit 77 in its high impedance state Z, so that a D.C. voltage output will result from the restorer 32 in accordance with the voltage level subsequently charged on capacitor 80.

The next pulse generated by the gate generator 23 is the pedestal clamp gate pulse (waveform B) which is applied, via line 70, to the pedestal clamp circuit 28 where it is effective to switch the associated gate circuit 71 to its high impedance state Z so that the subsequent pulse received as input from the video amplifier 25 of FIG. 3, as a result of sampling and mixing the jammer noise with the appropriate reference pulse from generator 21, is amplified and passed on to the short boxcar circuit 30. As shown at waveform C in FIG. 6, the sampling (and mixing) occurs substantially at the center of the pedestal clamp gate pulse.

At the same time that the input pulse signal to the pedestal clamp 28 is being amplified and passed on to the short boxcar circuit 30, the component gate circuit 73 thereof is switched to its high impedance state Z by the composite gate pulse (waveform D); whereas, the boxcar and dunk gate circuit 75 thereof is switched to its low impedance state Z' by the boxcar gate pulse (the relatively short pulse at the left-hand portion of waveform E). This permits the capacitor 80 to charge, in accordance with the input signal pulse received from video amplifier 25 of FIG. 3, to a voltage level indicative of the in-phase component of the sampled jammer signal relative to the reference pulse of corresponding frequency from the pulse generator 21. In a similar manner, the short boxcar circuit 31, of FIG. 3, would be controlled to store the quadrature component of the jammer signal relative to this same reference pulse.

Once the boxcar gate pulse ends, the boxcar and dunk gate circuit 75 of FIG. 5 is returned to its high impedance state Z, to hold the capacitor 80 at its present charge level, even though the input thereto is then grounded by termination of the composite gate pulse of waveform D. The voltage level charged on capacitor 80 is now coupled, via the D.C. restorer 32, to the phase computer 27 of FIG. 3.

Subsequently and slightly before the time at which the next reference pulse is generated by the pulse generator 21, the dunk gate pulse from the gate generator 23 (see the right-hand portion of waveform E in FIG. 6) once more switches the boxcar and dunk gate circuit 75 to its low impedance state Z', thereby discharging the capacitor 80 and making it ready to accept another input pulse signal for the subsequently sampled component of the jammer noise signal. Moreover, after the capacitor 80 has been thus discharged, the D.C. restorer gate pulse (waveform F) is terminated to again place the D.C. restorer clamp gate circuit 77 in its low impedance state Z', for reasons previously discussed.

From the foregoing discussion it will thus be noted that each of the in-phase and quadrature component signals appearing at the output of video amplifiers 25 and 26 respectively, in FIG. 3, is transformed into an equivalent D.C. voltage level for application to the phase computer 27. Subsequently, this phase computer 27 produces an output voltage analog of the phase difference existing between each reference pulse produced by the pulse generator 21 and the corresponding frequency component of the jammer noise signal received over the direct path $R_t$.

As previously discussed, this analog output of the phase computer 27 is used to adjust the variable phase shifters 36 in each of the different receiver channels employed in accordance with the illustrated embodiment of the present invention; whereby, all of these channels concurrently produce outputs which, when summed together in an appropriate microwave matrix or its equivalent, are effective to produce a compressed pulse distinctly identifying the location of the broadband barrage jammer J. Thus, the present invention has afforded a novel method and apparatus capable of accurately locating such a jammer in a completely passive manner; i.e., without requiring a transmission of any kind by the radar apparatus.

Obviously, many modifications and variations of the present invention are possible in light of the above teachings. It is therefore to be understood at this time that within the scope of the appended claims, the invention may be practiced otherwise than as specifically described.

What is claimed is:

1. The method of effecting acquisition of a broadband jammer target comprising the steps of:

generating reference pulses of predetermined different frequencies, sampling the jammer signal received at a first location directly from said jammer over a direct path of a known direction relative to said first location, determining the phase relationship existing between each of said generated reference pulses and the component of said direct jammer signal having the same frequency, relaying the jammer signal received at a second location, spaced a known distance from said first location, to said first location, adjusting each component of said relayed jammer signal having a frequency corresponding to the frequency of each of said generated reference pulses in accordance with the phase relationship found to exist between that frequency component as received in said direct jammer signal and said generated reference pulse of the same frequency such that the only phase difference then present between said relayed jammer signal components is due to the differential distance existing between the direct and relayed path lengths from said jammer target to said first location, and subsequently combining the adjusted components of said relayed jammer signal to produce an output signal distinctly identifying the location of said jammer target.

2. The method specified in claim 1, further including the steps of:
   dividing said relayed jammer signal into its component frequencies when received at said first location,
   applying each of said frequency components of said relayed jammer signal to one of a plurality of receiver channels,
   controlling each of said receiver channels so that output signals appear concurrently from each of said receiver channels, with the phase difference of each channel output signal relative to one another being dependent solely upon the differential distance existing between the direct and the relayed path lengths from said jammer to said first location, and
   combining the outputs of each of said receiver channels to produce a signal distinctly identifying the location of said jammer target.

3. The method specified in claim 2 wherein,
   said generated reference pulses are produced according to a programmed series,
   said sampling of the direct jammer signal occurs each time one of said reference pulses is generated,
   said determination of the phase relationship existing between each of said generated reference pulses and the same frequency component of said direct jammer signal is successively accomplished for each of said generated reference pulses, and
   each of said receiver channels is controlled to adjust the phase of each component of said relayed jammer signal according to both the sequence in which the reference pulses are successively generated and the phase relationship which exists between each relayed jammer component and the generated reference pulse having the same frequency.

4. The method specified in claim 1 wherein,
   said second location is movable relative to said first location.

5. A system for effecting passive acquisition of a broadband jammer target comprising,
   a source for generating multifrequency reference pulses in predetermined succession,
   means for periodically sampling jammer signals received at a first location over a direct first path from said jammer target, said direct first path having a known direction relative to said first location,
   phase determining means controlled in accordance with the predetermined succession in which said multifrequency reference pulses are generated for determining successively the phase relationship between each of said generated reference pulses and that component of the periodically sampled jammer signal having a comparable frequency,
   a plurality of receiving channels each assigned to a different one of the frequencies of said reference pulses and having circuit means therein for adjusting the phase of its assigned frequency signal,
   means controlled in accordance with the predetermined succession in which said reference pulses are generated and responsive to said phase determining means for controlling the phase adjusting circuit means of each receiver channel according to both the sequence in which said generated reference pulses are produced and the phase relationship existing between the assigned frequency component of said periodically sampled jammer signal and the generated reference pulse of comparable frequency,
   signal receiving and repeating means disposed at a second location spaced a known distance from said first location for relaying said jammer signal, when received thereby, onto said first location, whereby said jammer signal in being relayed to said first location traverses a second path longer than said direct first path,
   means for applying the frequency components of said relayed jammer signal selectively to said receiver channels, such that the frequency components in said relayed jammer signal which correspond in frequency to said generated reference pulses will produce concurrently an output signal from each of said receiver channels, and
   means operably connected to receive and combine the respective output signals from said receiver channels to produce a signal distinctly identifying the location of said jammer target.

6. The system specified in claim 5 wherein the phase adjusting circuit means of each of said receiver channels includes,
   first circuit means preset to delay the relayed jammer signal component applied thereto in accordance with the predetermined time at which the corresponding reference pulse is generated, and
   second circuit means operably connected to and controlled by said phase determining means for further shifting the phase of said applied relayed jammer signal component in accordance with the phase relationship existing beween the assigned jammer signal component and the corresponding generated reference pulse of comparable frequency.

7. The system as specified in claim 5 wherein said output signal combining means includes,
   a microwave matrix connected to the output of each of said receiver channels for producing a compressed pulse distinctly identifying the location of said jammer target.

8. The system as specified in claim 5 wherein said phase determining means includes,
   first circuit means operably connected to receive and mix together each of said generated reference pulses and the corresponding component of said periodically sampled jammer signal so as to produce a pair of output voltages whose respective amplitudes define the phase relationship between each of said generated reference pulses and the corresponding component of said periodically sampled jammer signal,
   second circuit means operably connected to the output of said first circuit means for storing each of said output voltages for a time slightly less than the time interval between said generated reference pulses, and
   computing circuit means operably connected to the output of said second circuit means for producing a voltage signal whose magnitude is the analog of the phase angle existing between each of said generated reference pulses and the corresponding periodically sampled jammer signal component.

9. The system specified in claim 8 further including commutating means controlled in accordance with the predetermined succession in which said refer ence pulses are generated and operably connected between said computing circuit means and said plurality of receiver channels for applying the analog voltage signal produced by said computing circuit means selectively to said receiver channels to control said phase adjusting circuit means therein.

10. The system specified in claim 9 wherein each of said receiver channels furthermore includes,
storage circuit means operably connected to receive the analog voltage signal selectively applied by said commutating means for storing each analog voltage signal produced for that receiver channel by said computing circuit means until a new analog voltage signal is produced for that receiver channel.

* * * * *